(12) United States Patent
Miller et al.

(10) Patent No.: US 8,305,189 B2
(45) Date of Patent: Nov. 6, 2012

(54) SYSTEM AND METHOD FOR CHANGING KEY STATUS IN A VEHICLE BASED ON DRIVER STATUS

(75) Inventors: Thomas Lee Miller, Ann Arbor, MI (US); Brian Bennie, Sterling Heights, MI (US); Martin J. Sultana, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 360 days.

(21) Appl. No.: 12/624,477

(22) Filed: Nov. 24, 2009

(65) Prior Publication Data

US 2011/0121941 A1 May 26, 2011

(51) Int. Cl.
*G05B 19/00* (2006.01)

(52) U.S. Cl. .......... 340/5.61; 340/5.1; 340/5.2; 340/5.3; 340/5.5; 340/5.6; 70/278.1; 70/336; 70/337; 70/342; 70/343

(58) Field of Classification Search ................... 340/5.61
See application file for complete search history.

(56) References Cited

U.S. PATENT DOCUMENTS

| | | | |
|---|---|---|---|
| 4,972,182 A | 11/1990 | Novik et al. | |
| 5,416,471 A | 5/1995 | Treharne et al. | |
| 5,508,694 A | 4/1996 | Treharne et al. | |
| 5,621,380 A | 4/1997 | Mutoh et al. | |
| 6,008,722 A | 12/1999 | Hirozawa et al. | |
| RE36,505 E | 1/2000 | Treharne et al. | |
| 6,160,488 A | 12/2000 | Honda | |
| 6,225,890 B1 | 5/2001 | Murphy | |
| 6,271,745 B1 | 8/2001 | Anzai et al. | |
| 6,386,007 B1 | 5/2002 | Johnson et al. | |
| 6,430,488 B1 | 8/2002 | Goldman et al. | |
| 6,501,369 B1 | 12/2002 | Treharne | |
| 6,518,882 B2 | 2/2003 | Johnson et al. | |
| 6,633,090 B2 | 10/2003 | Harter et al. | |
| 6,675,082 B2 | 1/2004 | Galli et al. | |
| 7,006,914 B1 | 2/2006 | Cahoon | |
| 7,038,331 B2 | 5/2006 | Yasukura | |
| 7,042,333 B2 | 5/2006 | Dix et al. | |
| 7,075,409 B2 | 7/2006 | Guba | |
| 7,212,099 B2 | 5/2007 | Zhai | |
| 2002/0133716 A1* | 9/2002 | Harif | 713/201 |
| 2004/0075530 A1 | 4/2004 | Ghabra et al. | |
| 2004/0263316 A1* | 12/2004 | Dix et al. | 340/5.23 |

(Continued)

OTHER PUBLICATIONS https://www.fordf150.net/howtp/patskey.php, "Program a New PATS Key", Mar. 3, 2007, 4 pages.

*Primary Examiner* — George Bugg
*Assistant Examiner* — Ojiako Nwugo
(74) *Attorney, Agent, or Firm* — Brooks Kushamn P.C.; Jennifer M. Stec

(57) ABSTRACT

In at least one embodiment, a vehicle apparatus for changing status for a key is provided. The vehicle apparatus comprises a controller. The controller is configured to receive a key identification signal from a first key and to transmit a key status signal indicative of whether the first key is one of a master key and a non-master key based on the key identification signal. The controller is further configured to receive a change request signal corresponding to a request to change status for an additional key from a primary key to a secondary key if the first key is master key.

16 Claims, 3 Drawing Sheets

U.S. PATENT DOCUMENTS

| | | |
|---|---|---|
| 2005/0012590 A1* | 1/2005 | Metlitzky et al. ............ 340/5.21 |
| 2005/0099265 A1* | 5/2005 | Dix et al. .................... 340/5.72 |
| 2006/0114101 A1 | 6/2006 | Schambeck et al. |
| 2006/0184289 A1 | 8/2006 | Sorensen et al. |
| 2009/0309697 A1 | 12/2009 | Miller et al. |
| 2010/0277273 A1 | 11/2010 | Miller et al. |

* cited by examiner

SYSTEM AND METHOD FOR CHANGING KEY STATUS IN A VEHICLE BASED ON DRIVER STATUS

BACKGROUND

1. Technical Field

The embodiments of the present invention described herein generally relate to a system and method for changing key status in a vehicle based on driver status.

2. Background Art

With conventional automotive vehicles, one or more keys are often shared between any number of drivers (e.g., parent/teen, employer/employee, owner/valet driver, or fleet vehicle owner/fleet vehicle driver). In one example, the parents of a teenager (or young adult) that is old enough to drive may share the keys for the vehicle with the teenager. The vehicle may be equipped with various safety and/or driver notification features that may be enabled/disabled via a user interface based on the driver's needs. However, in some circumstances, the parent may not intend to have the various safety and notification related features disabled by the teenager. The parent may enable the safety and notification features prior to allowing the teenager to drive the vehicle, however there is no guarantee that the teenager may keep the safety and notification features enabled while driving the vehicle. Conventional vehicles fail to give parents, or other primary drivers, the option of preventing teenagers eligible to driver or other such secondary drivers from disabling safety and notification features.

In light of the foregoing, it is generally necessary to differentiate between the drivers so that a determination can be made as to when a particular vehicle system should prevent the disabling of the safety and notification features (or other features) in the event the driver is detected to be a teenager or other secondary driver. Further, the determination may be needed to ensure that the primary driver is allowed to disable the safety and notification features as desired. As recognized, the safety and notification features are generally arranged such that a primary driver may disable the features in the event these features are not desired and are not mandatorily imposed by law or other ordinance.

SUMMARY

In at least one embodiment, a vehicle apparatus for changing status for a key is provided. The vehicle apparatus comprises a controller. The controller is configured to receive a key identification signal from a first key and to transmit a key status signal indicative of whether the first key is one of a master key and a non-master key based on the key identification signal. The controller is further configured to receive a change request signal corresponding to a request to change status for an additional key from a primary key to a secondary key if the first key is master key.

DETAILED DESCRIPTION

Figure 1:
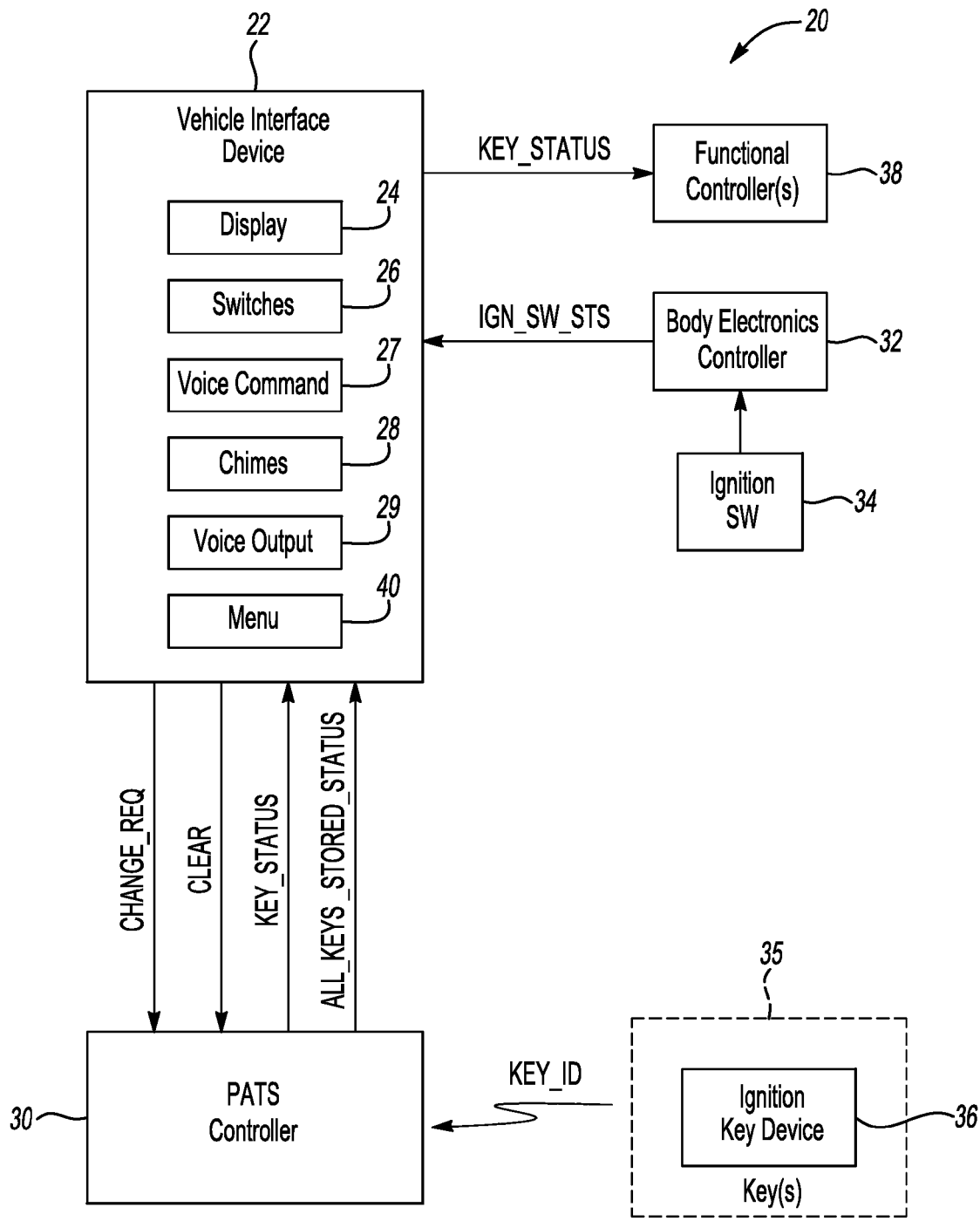
FIG. 1 depicts a system for changing key status for use in a vehicle in accordance to one embodiment of the present invention.

The embodiments of the present invention generally identify the driver of the vehicle whereby primary and secondary drivers are determined and various levels of vehicle control are granted to the driver by a master driver. The master driver may assign keys that belong to drivers of the vehicle as either a primary key or a secondary key. In general, the master driver (e.g., a parent, employer, consumer of valet services, fleet vehicle owner, etc.) may be defined as the administrative driver who can control levels of vehicle functionality (e.g., safety related and/or safety notification features) for the secondary driver. In general, the master driver and the primary driver are given similar levels of control over vehicle functionality. Meaning, that the master driver and the primary driver can enable/disable vehicle functionality as desired for himself/herself. However, the primary driver if detected to be a non-master is incapable of selecting which drivers are designated as primary or secondary. The secondary driver may be defined as a restricted driver who has limited control in enabling and disabling features generally provided by the vehicle and is to abide by the functional restrictions imposed or selected by the master driver. The system may prevent the non-master driver who has primary driver status from imposing functional restrictions on the secondary driver.

The embodiments of the present invention generally provide, among other things, a system and method for changing key status of a key based on driver status. For example, electrical device(s) in the vehicle may determine key status (e.g., whether the key is a master key) for a key that is used to gain access to the vehicle and allow a master driver to selectively change the status of an additional key as either a primary key or a secondary key. In general, the holder of the primary key (e.g., a primary driver) can enable/disable features as desired. The holder of the secondary key (e.g., a secondary driver) is incapable of turning off various features and is to abide by functional restrictions imposed by the master driver to ensure that safety related or safety notification features remain turned on for the secondary driver.

The embodiments of the present invention as set forth in FIGS. 1-4 generally illustrate and describe a plurality of controllers (or modules/devices), or other electrically based components. All references to the various controllers and electrically based components and the functionality provided for each, are not intended to be limited to encompassing only what is illustrated and described herein. While particular labels may be assigned to the various controllers and/or electrical components disclosed, such labels are not intended to limit the scope of operation for the controllers and/or the electrical components. The controllers may be combined with each other and/or separated in any manner based on the particular type of electrical architecture that is desired in the vehicle. It is generally recognized that each controller and/or module disclosed herein may include, but not limited to, any number of microprocessors, ICs, memory devices (e.g., FLASH, RAM, ROM, EPROM, EEPROM, or other suitable variants thereof), and software which co-act with one another to perform the various functions set forth below.

FIG. 1 depicts a system 20 for changing key status for use in a vehicle in accordance to one embodiment of the present invention. The system 20 generally comprises a vehicle interface device 22, a passive anti-theft security (PATS) controller 30, and a body electronics controller 32. The device 22 includes a display 24 that provides information related to the various states of vehicle functionality to the driver. For example, the display 24 may provide, but not limited to, a driver identification message during vehicle startup, various administrative menu options, a seatbelt warning message, a speed limit start up message, vehicle near top speed message, top speed message, driver identification speed warnings, and/or an inhibit ESC and FCW message. The display 24 may be implemented as a touch screen to enable a driver to make a selection therefrom.

The device 22 also includes a plurality of switches 26, a voice recognition command interface 27, chimes 28, and voice output capability 29. The driver may toggle the switches 26 to view different messages and/or select various options. The voice recognition command interface 27 may enable the vehicle to receive commands from the driver so that the driver may audibly input commands and/or responses. One example of a voice recognition command interface is disclosed in U.S. Patent Publication No. 20040143440 ("the '440 publication"), entitled "Vehicle Speech Recognition System", filed Dec. 31, 2003.

The chimes 28 may audibly notify the driver when predetermined vehicle conditions have been met. In one example, the device 22 may activate the chimes 28 when the vehicle is near a top speed, the vehicle has achieved a top speed, the vehicle has exceeded the top speed, there is a low level of fuel in the fuel tank, and/or when the traction control is enabled. In one example, the voice output capability 29 enables the device 22 to transmit audio signals to the driver in the manner, but not limited to, that described in the '440 publication. While the display 24, the switches 26, the voice input command interface 27, chimes 28, and the voice output capability 29 are shown within the device 22, it is contemplated that one or more of these mechanisms may be positioned exterior to the device 22.

The device 22, the PATS controller 30, and the body electronics controller 32 may communicate with one another via a data communication bus (or link). The communication bus may be implemented as a High/Medium Speed Controller Area Network (CAN) bus, a Local Interconnect Network (LIN), or other suitable data communication bus that is generally situated to facilitate data transfer therethrough. The particular type of bus used may vary based on the desired criteria of a particular implementation.

The body electronics controller 32 generally controls a portion or all of the electrical content in an interior section of the vehicle. In one example, the body electronics controller 32 may be a smart power distribution junction box (SPDJB) controller. The SPDJB controller may include a plurality of fuses, relays, and various micro-controllers for performing any number of functions related to the operation of interior and/or exterior electrically based functionality. These functions may include, but not limited to, electronic locking/unlocking (via interior door lock/unlock switches), remote keyless entry operation, vehicle lighting (interior and/or exterior), electronic power windows, and/or key ignition status (e.g., Off, Run, Start, and Accessory (ACCY)).

An ignition switch 34 may be operably coupled to the body electronics controller 32. The body electronics controller 32 may receive hardwired signal indicative of the position of the ignition switch 34 and transmit data messages on the data communication bus that are indicative of the position of the ignition switch. For example, the body electronics controller 32 may transmit a signal IGN_SW_STS (e.g., whether the ignition is in the OFF, Run, Start, or Accessory (ACCY) positions) over the data communication bus to the device 22. The signal IGN_SW_STS corresponds to the position of the ignition switch (e.g., Off, Run, Start, or Accessory positions).

The PATS controller 30 includes a transceiver (not shown) for wirelessly receiving the signal KEY_ID.

The ignition switch 34 may receive keys 35 to start the vehicle (e.g., multiple keys are provided so that each key is distributed to a different driver). Each key 35 includes an ignition key device 36 embedded therein for communicating with the vehicle. The ignition key device 36 may be in the form of a transponder that includes an integrated circuit and an antenna. The transponder is configured to transmit a signal KEY_ID in the form of a radio frequency (RF) signal to the PATS controller 30. The signal KEY_ID generally comprises RF data that corresponds to a manufacturing code, a key serial number, and encrypted data.

The key serial number, the manufacturing code and the encrypted data on the signal KEY_ID are used to authorize an engine controller (not shown) to start an engine of the vehicle in the event the such information data matches similar data in a look up table (LUT) or other data format of the PATS controller 30. In addition, the PATS controller 30 may also use the data on the signal KEY_ID to determine whether the key that is used to access the vehicle is a master key, a non-master key, a primary key or a secondary key. The driver who holds the master key is presumed to be the master driver, the driver who holds the primary key is presumed to be the primary driver, and the driver who holds the secondary key is presumed to be the secondary driver. The master driver is also designated as a primary driver.

The holder of the master key is capable of programming remaining non-master keys (e.g., whether a primary key or a secondary key) as the primary key or the secondary key. The holder of the master key has all of the privileges generally given to the holder of the primary driver. However, the holder of the master key has the added privilege of programming non-master keys as a primary key or as a secondary key as desired.

The manufacturer code generally corresponds to the identity of the manufacturer of the vehicle. For example, the manufacturer code may correspond to Ford Motor Company. The manufacturer code prevents the user (or technician) from mistakenly configuring a key with a manufacturer code of another vehicle. An example of the LUT as noted above that may be stored in the PATS controller 30 is shown in TABLE 1 directly below.

TABLE 1

| KEY SERIAL # | MAN. CODE | ENCRYPTED DATA | Master Key Status | TYPE |
| --- | --- | --- | --- | --- |
| 1xxA | Ford | #$#$#$#$#$#$#$# | Master | Primary |
| 2xxB | Ford | #######$$$$$$$$ | Non-Master | Secondary |
| 3xxC | Ford | $#$#$#$#$#$#$#$ | Non-Master | Secondary |
| NnnN | Ford | $$$$$$$$######## | Non-Master | Primary |

The LUT may include any number of keys. As noted above, the PATS controller 30 receives the key serial number, the manufacturing code, and the encrypted data on the signal KEY_ID and compares to the data in any of the rows in the LUT to determine whether there is a match to enable the engine to be started. The PATS controller 16 decrypts the encrypted data prior to comparing the underlying data to predetermined data.

To determine master key status, the PATS controller 30 decodes the key number and/or the encrypted data received on the signal KEY_ID and reads the corresponding master key status (e.g., master or non-master) next to the key number and/or the encrypted data as shown in the heading 'MASTER KEY STATUS' of Table 1 to determine whether the key is the master key or the non-master key. The PATS controller 30 may also determine the type of key (e.g., whether the key is a primary key or a secondary key) based on the key serial number and/or the encrypted data. The PATS controller 30 transmits a signal KEY_STATUS to the vehicle interface device 22 to indicate whether the key is a master key or a non-master key. The KEY_STATUS signal also provides information as to whether the key is a primary key or a secondary key. The signal KEY_STATUS corresponds to the particular key that is used to gain access to the vehicle, put the vehicle into an accessory mode, and/or to start the engine of the vehicle.

The PATS controller 30 and/or the vehicle interface device 22 may transmit the signal KEY_STATUS to functional controller(s) 38 (e.g., controller or module in the electrical system) such that the functionality or operation performed by a particular controller (or module) may be selectively controlled based on the key status (and/or the driver status). For example, seat belt minder, fuel level indicator, reverse park aid, object detection, and traction control as found in U.S. patent Ser. Nos.: 12/026,582, entitled "SYSTEM AND METHOD FOR CONTROLLING A SAFETY RESTRAINT STATUS BASED ON DRIVER STATUS" and filed on Feb. 6, 2008; 12/026,857, entitled "SYSTEM AND METHOD FOR CONTROLLING EARLY LOW FUEL WARNING BASED ON DRIVER STATUS" and filed on Feb. 6, 2008; 12/026,867, entitled "SYSTEM AND METHOD FOR CONTROLLING ELECTRONIC STABILITY CONTROL BASED ON DRIVER STATUS" and filed on Feb. 6, 2008; and 12/026,872, entitled "SYSTEM AND METHOD FOR CONTROLLING OBJECT DETECTION BASED ON DRIVER STATUS" and filed on Feb. 6, 2008, all of which are hereby incorporated by reference in their entirety, and are illustrative of the types of functionality or operations that may be selectively controlled based on the driver status of the vehicle. In particular, the secondary driver may not be able to disable the seatbelt minder feature, the reverse park feature, the object detection feature and the traction control feature. It is contemplated that any number of operations may be selectively controlled based on driver status and that those listed herein are simply noted for illustrative purposes.

The PATS controller 30 assigns all of the keys as primary keys when the vehicle is manufactured. The PATS controller 30 may update key status for a particular key via the vehicle interface device 22. The PATS controller 30 may also assign one or more of the keys as a master key. In one example, two keys may be programmed as master keys (e.g., a master key for each parent) prior to the vehicle being sold. The first and the second keys that are programmed to the PATS controller 30 may automatically be assigned a master key. As is known, the key is to be programmed to the PATS controller 30 via a programming operation. This operation may take place at the body and assembly plant or at the vehicle dealership prior to the customer taking delivery of the vehicle. In the programming mode, the PATS controller 30 stores at least a portion of the data on the signal KEY_ID in the appropriate columns of the LUT. The key serial number and encrypted data is stored within the LUT. The LUT may include the manufacturer type as a default. The PATS controller 30 may automatically generate the primary or secondary key type designation under 'TYPE' and the master or non-master key-type designation under 'Master Key Status' in response to the key being programmed to the vehicle (or to the PATS controller 30). In general, the PATS controller 30 assigns the first and the second keys that are programmed thereto as master keys and primary keys and the remaining keys are designated as non master keys and as primary keys.

In one example, assume that three keys are given to a customer who purchases a vehicle. In this example, the PATS controller 30 may designate the first and the second keys that are programmed to PATS controller 30 as both master and primary keys. The third key may be designated as a non-master key and a primary key. The system 20 is configured such that the holder of the master key can selectively change the key status for the third key holder from a primary key to a secondary key via a menu 40 on the vehicle interface device 22. The menu 40 may be audibly transmitted via the voice output 29 or visually transmitted via the display 24 (the holder may select items on the menu 40 by touch via the switches 28 or audible command via the voice command 27). The vehicle interface device 22 prevents non-master key holders from changing key status for other holders of the keys once the key is detected to be a non-master key. The master key may be needed to prevent, perhaps a secondary driver such as a teenager (or employee) whose key is currently designated as a primary key from changing the key status for the owner of the vehicle from a primary key to a secondary key. Assuming, the owner of the vehicle retains the master key, only the owner of the vehicle can change key status for the remaining key holders. The vehicle interface device 22 is not configured to change the status from a primary key to a second key for the master key. In one example, the master keys may have unique markings included thereon to indicate that such keys are master keys. In yet another example, the device 22 may visually or audibly present information regarding the master key status to the driver of the vehicle. For example, the device 22 may indicate that the key electrically coupled thereto is a master key. In this example, the device 22 may announce the master key type based on which key was used to gain entry into the vehicle, place the ignition status in "accessory", or start the engine of the vehicle.

In another example, in order to establish a master key, the signal KEY_ID as transmitted from the key 35, may include specific data (or bit data) to indicate master or non-master status. For example, in addition to the signal KEY_ID including key serial number, manufacturer number, and encrypted data, the signal KEY_ID may further include master status data. The master status data may correspond as to whether the key is defined as a master key or a non-master key.

In general, for the master driver to change status for a key, the master driver inserts the master key 35 in the ignition switch 34. The key 35 transmits the signal KEY_ID to the PATS controller 30. The PATS controller 30 recognizes that the key 35 is a master key by cross-referencing the data on the signal KEY_ID to the data stored in the LUT. The PATS controller 30 transmits the signal KEY_STATUS to the device 22. The signal KEY_STATUS indicates that the key is both a master key and a primary key. The device 22 may notify the master driver that the key is a master key. The master driver is capable of selecting options on the menu 40 in the device 22 to enable the designation of the remaining non-master keys from a primary key to a secondary key or vice versa. The PATS controller 30 may send a signal ALL_KEYS_STORED_STATUS which includes the TYPE designation (e.g., whether keys in LUT are assigned as primary keys and/or secondary keys) and the key serial number for all keys stored in the LUT to the vehicle interface device 22. The vehicle interface device 22 may visually or audibly present such information (e.g., all key status information) to the master driver so that the master driver can change the designation of various keys that are presented from the primary to secondary status or the secondary to the primary status.

In one example, the vehicle interface device 22 may allow the master driver to name corresponding keys so that the master driver can select the keys based on the corresponding name. For example, the vehicle interface device 22 may enable the master driver to name a particular key as John Smith Jr. who may be the teenage son of the master driver (or may be an employee of the master driver) via any one of the inputs (e.g., display 24, switches 26, voice command 27) on the vehicle interface device 22. This naming feature may enable the master driver to quickly identify the person who is assigned to the key and change the status of the key (e.g., from a primary key to a secondary key) rather easily. In response to detecting a key status changes (e.g., from primary to secondary), the vehicle interface device 22 may transmit a signal CHANGE_REQ that includes data reflecting such a change in status. The PATS controller 30 updates the LUT so that the corresponding key that is assigned to John Smith Jr. is changed from the primary key to the secondary key. The vehicle interface device 22 may correlate the person that is the holder of the key (e.g., John Smith Jr.) to the particular key serial number as identified in the signal KEY_STATUS and simply send the key serial number with the newly assigned status (e.g., secondary key) on the signal CHANGE_REQ to the PATS controller 30. As exhibited with the above description, the key status for a particular key is changed in the PATS controller 30, thus, the signal KEY_ID that is transmitted from the key 35 is not changed at all when it is desired to modify the key status for a particular driver.

The master driver may optionally clear all keys that are designated as secondary keys via the vehicle interface device 22 and change the status to primary. In such a case, the primary driver may command (e.g., via touch or audible) to clear all keys in the LUT that are programmed as secondary keys. The vehicle interface device 12 transmits a signal CLEAR to control the PATS controller 30 to clear (or change) the secondary key to primary keys.

It is contemplated that the data on the signals that are transmitted between the vehicle interface device 22 and the PATS controller 30 may be transmitted as digital data over the communication bus. The PATS controller 30 may be implemented as a standalone component or corresponding circuitry and software included within another controller.

Figure 2:
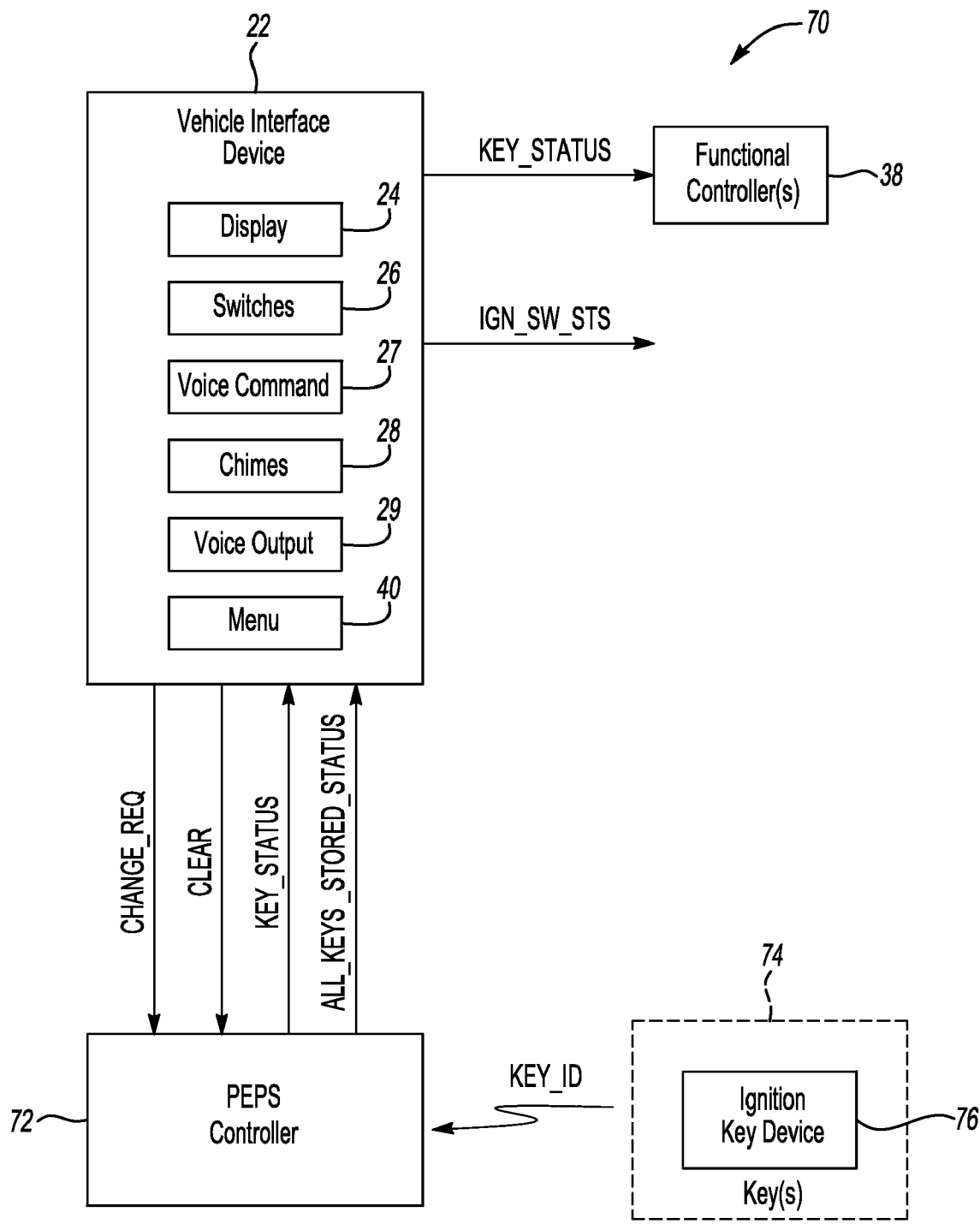
FIG. 2 depicts a system for changing key status for use in a vehicle in accordance to one embodiment of the present invention.

FIG. 2 depicts a system 70 for changing key status for use in a vehicle in accordance to one embodiment of the present invention. The system 70 includes the vehicle interface device 22 and a passive entry passive start (PEPS) controller 72. The PEPS controller 72 may be used in place of the PATS controller 30 as noted in connection with FIG. 1. While FIG. 2 generally illustrates that the PEPS controller 72 is positioned external to the vehicle interface device 22, other implementations may include positioning circuitry and software used to perform the operations of the PEPS controller 72 within the vehicle interface device 22 or within any other controller or module in the vehicle.

In general, the PEPS function is a keyless access and start system. The driver may own two or more keys 74 that may be in the form of an electronic transmission device (e.g., a key fob). With the PEPS implementation, the user is not required to use a mechanical key blade to open the door of the vehicle or start an engine of the vehicle. The key 74 may include a mechanical key to ensure that the driver can access and start the vehicle in the event the key 74 exhibits low battery power. The keys 74 each include an ignition key device 76 embedded within for communicating with the PEP controller 72. The ignition key device 76 may be in the form of a transponder that includes an integrated circuit and an antenna. The transponder of the ignition key device 76 is configured to transmit the key serial number and encrypted data on the signal KEY_ID as an RF signal to a receiver (not shown) in the PEPS controller 72. To gain access or entry into the vehicle with the keys 74, the driver may need to wake up the PEPS controller 72 to establish bi-directional communication between the keys 74 and the PEP controller 72. In one example, the wake up may occur by requiring the driver to touch and/or pull the door handle of the vehicle. In response to the door handle being toggled or touched, the PEPS controller 72 may wake up and transmit RF based signals to the key 74. The PEPS controller 72 and the key 74 may undergo a series of communications back and forth to each other (e.g., handshaking) for vehicle access authentication purposes. The PEPS controller 72 may unlock the doors in response to a successful completion of the handshaking process. Once the driver is in the vehicle, the driver may simply press a button positioned on an instrument panel and brake pedal to start the vehicle. The driver may only press the button to place the vehicle into an accessory mode.

In general, the PEPS controller 72 may include a LUT that is similar to that described in connection with FIG. 1. The contents of the LUT as illustrated in connection with the PATS controller 30 are similar to that of the PEPS controller 72. For example, the LUT of the PEPS controller 72 includes the key serial number, the manufacturer code, the encrypted data, the type (e.g., primary or secondary status for the keys) and the master key status (e.g., whether the key is a master key or a non-master key). The operation of having the master driver change the status from a primary key to a secondary key or from a secondary key to a primary key is similar to that described in connection with FIG. 1. In addition, the master driver has the capability of naming or designating keys with various name or other labels so that such named keys are easily identifiable when the master driver intends to change the key status for a particular member of his/her family or for an employee who is under the control of the master driver. The "clear all" function as described in connection with FIG. 1 may also be implemented by the vehicle interface device 22 and the PEPS controller 72.

Figure 3:
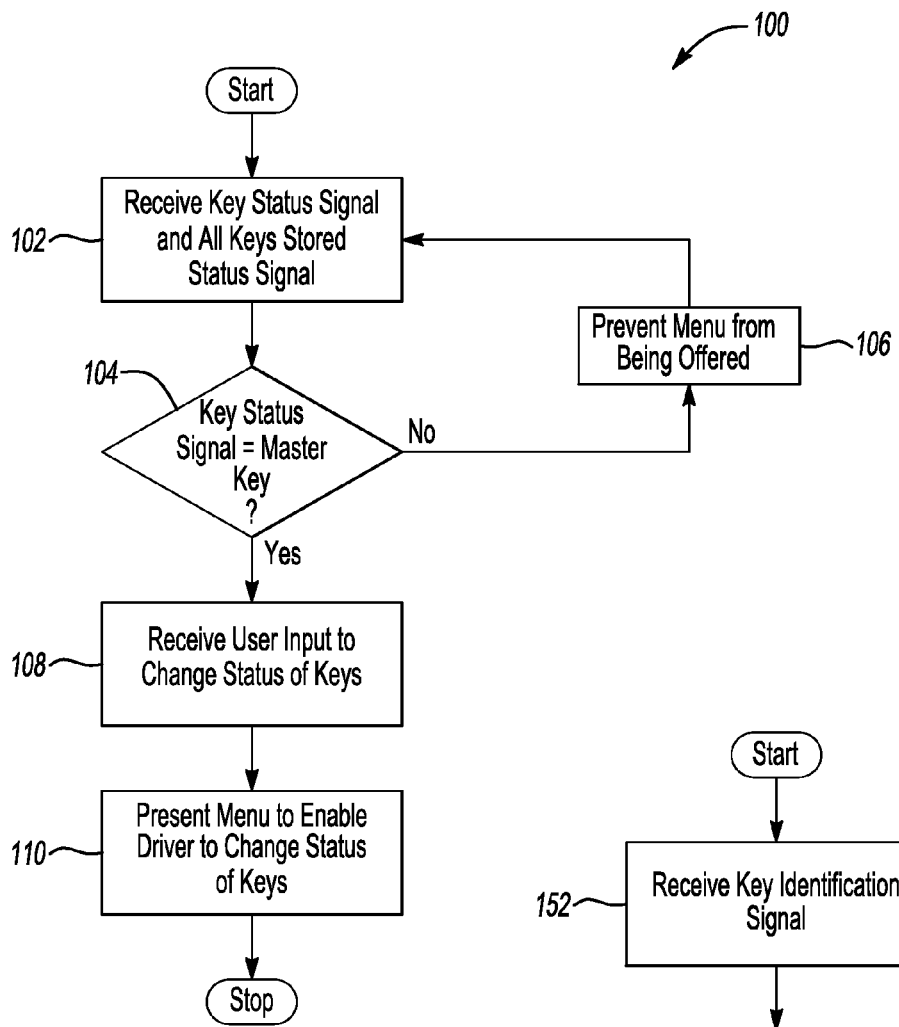
FIG. 3 depicts a method for enabling a primary driver to change key status in accordance to one embodiment of the present invention.

FIG. 3 depicts a method 100 for changing key status for use in a vehicle in accordance to one embodiment of the present invention. It is recognized that the operations disclosed in connection 100 may be executed in any suitable arrangement and that the operations are not intended to be executed solely in the manner shown.

In operation 102, the vehicle interface device 22 receives the signal KEY_STATUS and the signal ALL_KEYS_STORED_STATUS from the PATS or PEPS controller 30, 70 (depending on which system 20 or 70 is implemented). The signal KEY_STATUS indicates, among other things, whether the key that was used to gain access into the vehicle, place the vehicle into the accessory mode, or start the engine in the vehicle, belongs to a master driver or to a non-master driver. The signal ALL_KEYS_STORED_STATUS indicates all information contained in the LUT for all keys programmed therein.

In operation 104, the vehicle interface device 22 determines whether the signal KEY_STATUS indicates that the holder of the key that was used to gain access into the vehicle, place the vehicle in accessory mode, or start the vehicle is the master or the non-master. If the device 22 determines that the holder of the key is the non-master, then the method 100 moves to operation 106. If the device 22 determines that the holder of the key is the master, then the method 100 moves to operation 108.

In operation 106, the vehicle interface device 22 prevents the driver from selecting options on the menu 40 that enables the driver to change status of the keys (e.g., the menu is not presented to the driver).

In operation 108, the vehicle interface device 22 receives an initial user input via one or more of the display 24 (touch entry), the switches 26, and the voice command 27 to change status of one or more of the keys 35 or 74.

In operation 110, the vehicle interface device 22 presents the menu 40 which lists all stored key and corresponding names (e.g., John Smith Jr. as noted above). The vehicle interface device 22 may include its own LUT that matches key serial number for all keys identified on the signal ALL_KEYS_STORED_STATUS to their corresponding names as established by the master driver. The driver is capable of changing key status for one or more of the keys identified therein from a primary key to a secondary key or from a secondary key to a primary key. The driver is also capable of adding names to newly programmed keys to individuals or renaming pre-existing keys.

Figure 4:
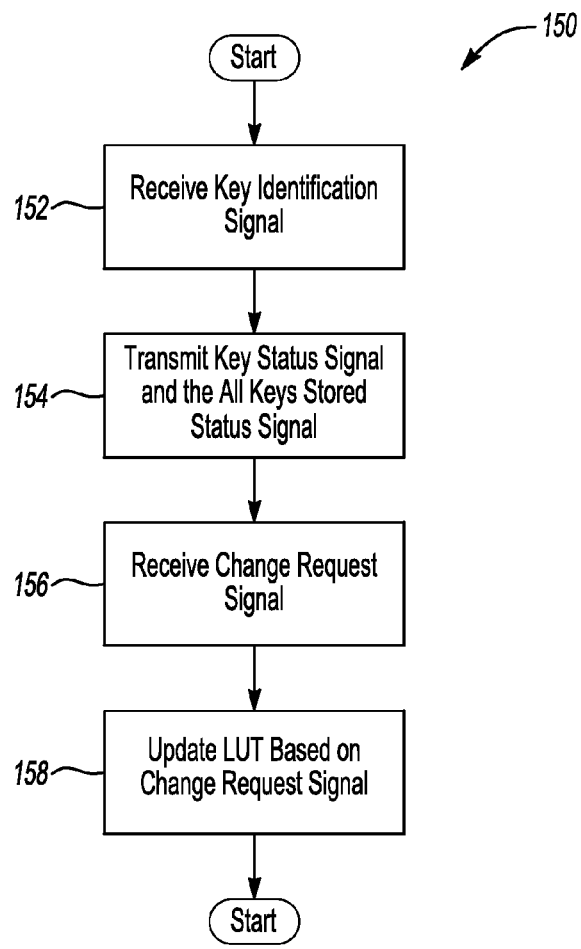
FIG. 4 depicts a method for changing key status in accordance to one embodiment of the present invention.

FIG. 4 depicts a method 150 for changing key status for use in a vehicle in accordance to one embodiment of the present invention. It is recognized that the operations disclosed in connection 150 may be executed in any suitable arrangement and that the operations are not intended to be executed solely in the manner shown.

In operation 152, the controller 30 or 72 receives the signal KEY_ID from the keys 35 or 74.

In operation 154, the controller 30 or 72 transmits the signal KEY_STATUS to the vehicle interface device 22 (and to other controllers/modules in the vehicle that has in interest in receiving such signal). The controller 30 or 72 determines whether the holder of the key that is used to gain access into the vehicle is a master driver or a non-master driver based on the signal KEY_ID. The controller 30 or 72 also determines the key type (e.g., whether the driver of the vehicle is a primary driver or a secondary driver). The controller 30 or 72 also transmits the signal ALL_KEYS_STORED_STATUS signal to the vehicle interface device 22.

In operation 156, the controller 30 or 72 receives the signal CHANGE_REQUEST. In this operation, the master driver has changed status from a primary key to a secondary key or from a secondary key to a primary key via the vehicle interface device 22.

In operation 158, the controller 30 or 72 updates the LUT based on the information included within the signal CHANGE_REQUEST.

While embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A vehicle apparatus for changing status for a key, the vehicle apparatus comprising:
    a controller for being positioned in a vehicle, the controller being configured to:
        receive a key identification signal indicative of whether a first key is one of a master key and a non-master key;
        receive a request signal corresponding to a request to change status for an additional key from a primary key to a secondary key if the first key is the master key;
        provide a menu for receiving a user input to change status for an additional key from a primary key to a secondary key if the key status signal corresponds to the master key;
        enable a user to assign a name the corresponds to a particular holder of the additional key if the key status signal corresponds to the master key; and
        enable the user to select the name via the menu to change status for the additional key from the primary key to the secondary key.

2. The vehicle apparatus of claim 1 wherein the controller is further configured to wirelessly receive the key identification signal from the first key.

3. The vehicle apparatus of claim 1 wherein the key status signal comprises key serial number information, manufacturer code information, and authorization data for the first key.

4. The vehicle apparatus of claim 3 wherein the controller is further configured to determine whether the first key is the master key by comparing at least one of the key serial number information and the authorization data to predetermined data stored therein.

5. The vehicle apparatus of claim 1 wherein the controller further comprises a look up table that stores data related to whether the second key is the primary key or the secondary key.

6. The vehicle apparatus of claim 5 wherein the controller is further configured to change the additional key from the primary key to the secondary key in the look up table in response to the request signal.

7. The vehicle apparatus of claim 1 wherein the primary key enables unrestricted use over vehicle functionality and the secondary key prevents vehicle functionality from being disabled.

8. The vehicle apparatus of claim 1 wherein the primary key is configured to enable unrestricted use over vehicle functionality and the secondary key is configured to prevent vehicle functionality from being disabled.

9. A vehicle apparatus for changing status for a key, the vehicle apparatus comprising:
    an interface device for being positioned in a vehicle, the interface device being configured to:
        receive a key status signal indicative of whether a first key is one of a master key and a non-master key;
        provide a menu for receiving a user input to change status for an additional key from a secondary key to a primary key if the key status signal corresponds to the master key;
        enable a user to assign a name the corresponds to a particular holder of the additional key if the key status signal corresponds to the master key; and
        enable the user to select the name via the menu to change status for the additional key from the secondary key to the primary key.

10. The vehicle apparatus of claim 9 wherein the interface device is further configured to transmit a request signal indicative of a request to change status for the additional key from the primary key to the secondary key in response to the user input.

11. The vehicle apparatus of claim 9 wherein the interface device is further configured to visually or audibly present the menu.

12. The vehicle apparatus of claim 9 wherein the primary key is configured to enable unrestricted use over vehicle functionality and the secondary key is configured to prevent vehicle functionality from being disabled.

13. A method for changing status for a key, the method comprising:
- receiving a key status signal indicative of whether a first key is one of a master key and a non-master key;
- providing a menu in a vehicle for receiving a user input to change status for an additional key from a secondary key to a primary key if the key status signal corresponds to the master key; and
- receiving a signal to assign a name that corresponds to a particular holder of the additional key if the key status signal corresponds to the master key; and
- enabling the user to select the name via the menu to change status for the additional key from the secondary key to the primary key.

14. The method of claim 13 further comprising visually or audibly presenting the menu to receive the user input.

15. The method of claim 13 further comprising transmitting a request signal indicative of a request to change status for the additional key from the primary key to a secondary key in response to the user input.

16. The method of claim 13 wherein the primary key is configured to enable unrestricted use over vehicle functionality and the secondary key is configured to prevent vehicle functionality from being disabled.

* * * * *